Jan. 8, 1946.    R. DAUB    2,392,464
INTERNAL-COMBUSTION ENGINE
Filed Nov. 18, 1943    10 Sheets-Sheet 1

INVENTOR.
Rudolph Daub
BY
Frank A. Bower
ATTORNEY

Jan. 8, 1946.   R. DAUB   2,392,464
INTERNAL-COMBUSTION ENGINE
Filed Nov. 18, 1943   10 Sheets-Sheet 6

Fig. 9

INVENTOR.
Rudolph Daub
BY
Frank R. Bower
ATTORNEY

Jan. 8, 1946.                    R. DAUB                    2,392,464
                       INTERNAL-COMBUSTION ENGINE
                         Filed Nov. 18, 1943         10 Sheets-Sheet 7

INVENTOR.
Rudolph Daub
BY
Frank A. Bower
ATTORNEY

Jan. 8, 1946.  R. DAUB  2,392,464
INTERNAL-COMBUSTION ENGINE
Filed Nov. 18, 1943  10 Sheets-Sheet 8

INVENTOR.
Rudolph Daub
BY
Frank A. Bower
ATTORNEY

Jan. 8, 1946.  R. DAUB  2,392,464
INTERNAL-COMBUSTION ENGINE
Filed Nov. 18, 1943  10 Sheets-Sheet 10

INVENTOR.
Rudolph Daub
BY
Frank A. Bower
ATTORNEY

Patented Jan. 8, 1946

2,392,464

UNITED STATES PATENT OFFICE 2,392,464

INTERNAL-COMBUSTION ENGINE

Rudolph Daub, West Caldwell, N. J.

Application November 18, 1943, Serial No. 510,717

13 Claims. (Cl. 123—53)

This invention relates to four-cycle internal combustion engines and particularly to such engines for automobiles, trucks, and the like.

In road vehicles the demand is for shorter engines and this has been emphasized by the trend to fluid flywheels and automatic transmissions encroaching more and more on the space allotted to the engine.

An object of this invention is to provide a four-cycle in-line engine short in proportion to its power output and thereby correspondingly shortening the wheel base of the vehicle and in some cases permitting installation in limited space such, for instance, as crosswise in a rear engine drive of a passenger car.

A further object is the provision of an efficient high-compression, high specific output anti-detonation combustion chamber with overhead valves and ports of high capacity for a given piston area.

Further objects of the invention particularly in the double piston structure and cooling of the engine will appear from the following specification taken in connection with the accompanying drawings, in which.

Figure 1:
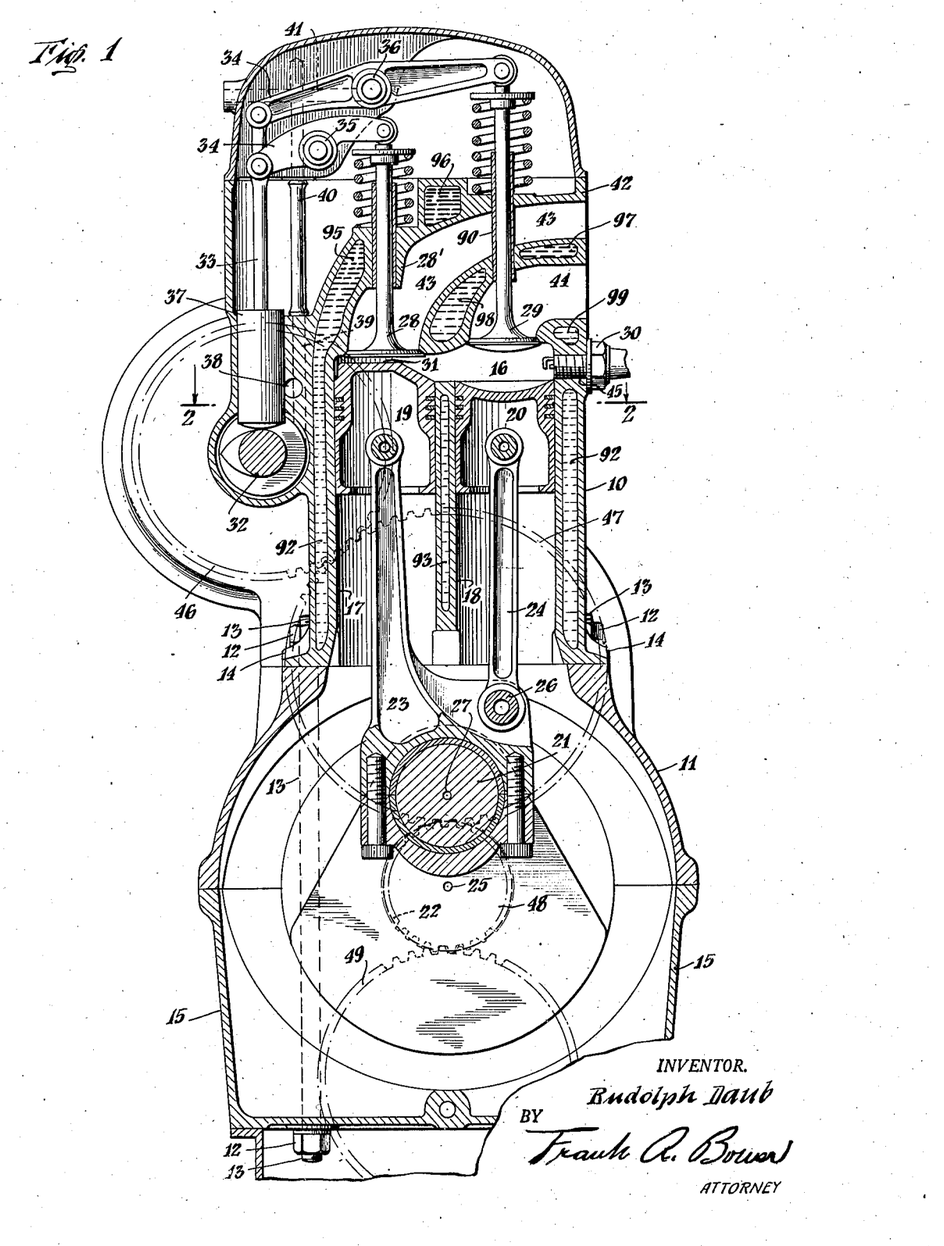
Fig. 1 is a vertical sectional view of the engine of Fig. 3 taken at right angles to the crankshaft and showing the double piston combination at top stroke compressing the gas mixture into the specially shaped combustion chamber.

Fig. 1 shows a cross section of an engine embodying the invention. 10 is the cylinder block with cylinder heads cast in one piece and secured to the crankcase upper half 11 by nuts 12 and studs 13. To that end bosses 14 for the nuts 12 are provided on the cylinder block at its base and farthest removed from the combustion chamber. This region of the block is not subject to the complicated combined dynamic and thermal stresses as is the combustion chamber and its immediate vicinity, and is therefore better suited for the location of a dividing joint. The same studs 13 are employed to clamp the two crankcase and crankshaft bearing halves 11 and 15 together giving an efficient structure of low weight and simple form.

Terminating in the combustion chamber 16 are both the master cylinder bore 17 and the articulated cylinder bore 18. Reciprocating within these bores are master piston 19 and articulated piston 20. Both pistons are connected to a single crankpin 21 of crankshaft 22 by means of a master connecting rod 23 and an articulated rod 24. The position of both cylinder bores of each pair in relation to the crankpin is such that a common plane taken through the bores is normal to the crankshaft axis 25. The crankshaft axis lies substantially midway between the axes of the cylinder bores 17 and 18, i. e., it is considerably offset from the axis of the master cylinder bore 17. This offset causes a great difference between the master rod angularities during the up and down strokes of the master piston and a corresponding difference in piston side loads. Therefore, knuckle pin 26 of articulated rod 24 is so positioned in its relation to the crankpin center 27 as to almost completely correct and normalize these differences by the action of the articulated piston and articulated rod on the knuckle pin and master rod, as will be explained later in more detail with reference to Figs. 4, 5 and 6.

Coaxial with the master cylinder is intake valve 28 in guide 28' and coaxial with the articulated cylinder is exhaust valve 29 in guide bushing 90, permitting the cylinder bores, the valve seats and valve guides to be machined in the same setting. The opening for the valve is placed in the center of its respective cylinder end wall to give a stronger structure as compared to the conventional single cylinder overhead vertical valve design wherein the cylinder end wall is broken through by two openings leaving a rather thin bridge directly in the center of the cylinder where the stresses are very high.

The vertical valves able to be accommodated in a conventional single cylinder design are very much smaller in comparison to the subject dual cylinder design, as the following example will show:

Assuming a piston area of six square inches per cylinder unit, the inside diameter of a single cylinder will be 2.750". Allowing .125" clearance between the cylinder wall and each valve plus .125" clearance between the valves results in a valve head diameter of 1.187", having an area of 1.10 square inches. In a dual cylinder design having the same piston area where the diameter of one piston is 1.960", the diameter of the valve head can be 1.625" having an area of 2.07 square inches, an increase in area of over 80% over the single cylinder vertical valve design.

The higher breathing capacity of the valves and their parts in cooperation with smaller and therefore better cooled pistons and cylinders gives a higher output per square inch of piston area within a given length as compared to the conventional large piston and small valve combination. The subject invention makes this a possibility without resorting to the more complicated and costly V-engine design, nor to the conventional high capacity valve arrangement whereby the valves must be angulated to permit a larger valve diameter necessitating an expensive valve actuating mechanism and in most cases a detachable cylinder head. Actually the capacity of the new dual cylinder coaxial valve design is even superior to the single cylinder angulated valve arrangement as a comparison with that of a high output aircraft engine cylinder. Such aircraft engine cylinder has an intake valve head area of 8.29 square inches (3¼" diam. valve) and a piston area of 29.46 square inches (6⅛" diam. piston), hence a ratio of $$\frac{8.29}{29.46} = .28$$

whereas the present dual cylinder engine has a ratio of $$\frac{2.07}{6.00} = .345$$

an increase of 23%.

The valves are operated by camshaft 32 via pushrods 33 and rockers 34. The rocker arm bearings 35 and 36 are formed as part of the valve cover. Hydraulic tappets 37 are provided between the camshaft and the pushrods, the tappets receiving their oil supply through oil hole 38 running the full length of the cylinder block. Connected to hole 38 is the vertical hole 39 lubricating through its lower end the camshaft bearings and its upper end via tube 40 and hole 41 the valve rocker bearings. Face 42 on cylinder block 10 forms the terminal of the intake port 43, exhaust port 44 and spark plug hole 45. It will be noted that intake port 43 on its way in an easy sweep to face 42 straddles the exhaust valve guide 90. The intake manifold, exhaust manifold, hot spot provision, etc., are not shown and are conventional with the exception that the branches of the manifolds are shorter, which in case of the intake manifold facilitates equal distribution between the cylinder units.

Having the carburetor, manifolds and spark plugs all on one side of the engine is important, particularly in installations in crowded places where one side of the power plant is facing against a wall as in the rear of a vehicle for instance, or, if the engine is mounted with its cylinders horizontally, all the above items can be on top and easily accessible.

Figure 3:
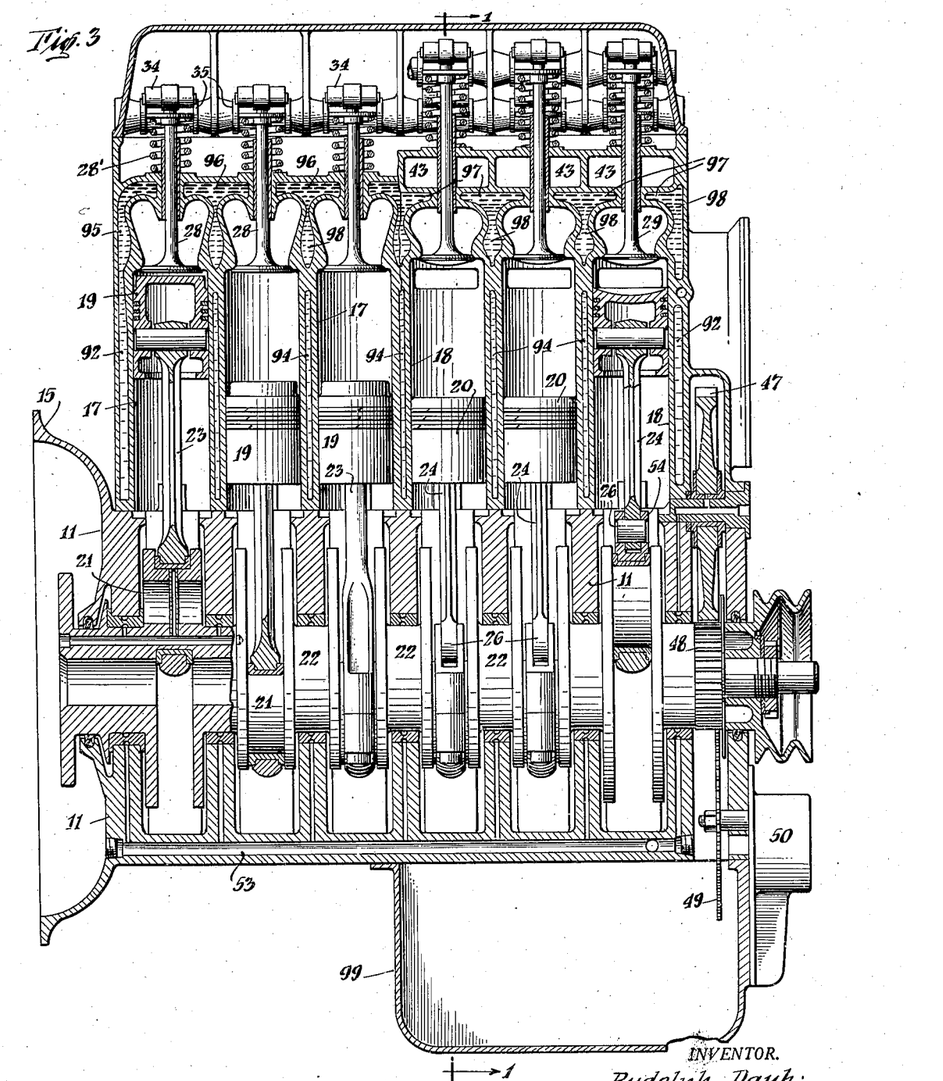
Fig. 3 is a vertical sectional view taken in the plane of the axis of the crankshaft and illustrating an engine having six double cylinders.

Camshaft 32 is driven by gear 46, idler 47 and pinion 48, the latter one being keyed to the front end of the crankshaft. Gear 49, also meshing with pinion 48, drives the oil pump 50 (Fig. 3).

Referring to the combustion chamber 16, it will be noted that spark plug 30 is placed near the exhaust valve 29, i. e., in the "hot" zone of the chamber. A close clearance space or detonation trap 31 is formed in the part of the chamber farthest remote of the spark plug between the top of the master piston and the bottom of the intake valve. The function of this detonation trap is in short as follows:

The flame front starting at the spark plug rushes across the chamber towards the master piston. In doing so it raises the pressure and thereby the temperature of the charge farthest remote from the plug to a self-igniting or detonating level before the flame front reaches it to burn it in an orderly and "smooth" manner. To prevent this, the last part of the charge to burn is thinned out to promote rapid heat transfer into the adjacent combustion chamber walls, in this case the master piston and the intake valve.

The dual cylinder coaxial overhead valve design thus fulfills all requirements for a high power, high efficiency power plant, i. e., extremely large valves, small pistons and small cylinders for high specific output, a good anti-detonation chamber, with smooth combustion features adaptable to the highest compression ratios, resulting in low fuel consumption and increased durability, and a compact, light integrally cast cylinder block and head design, easy and economical to produce.

Figures 2, 7:
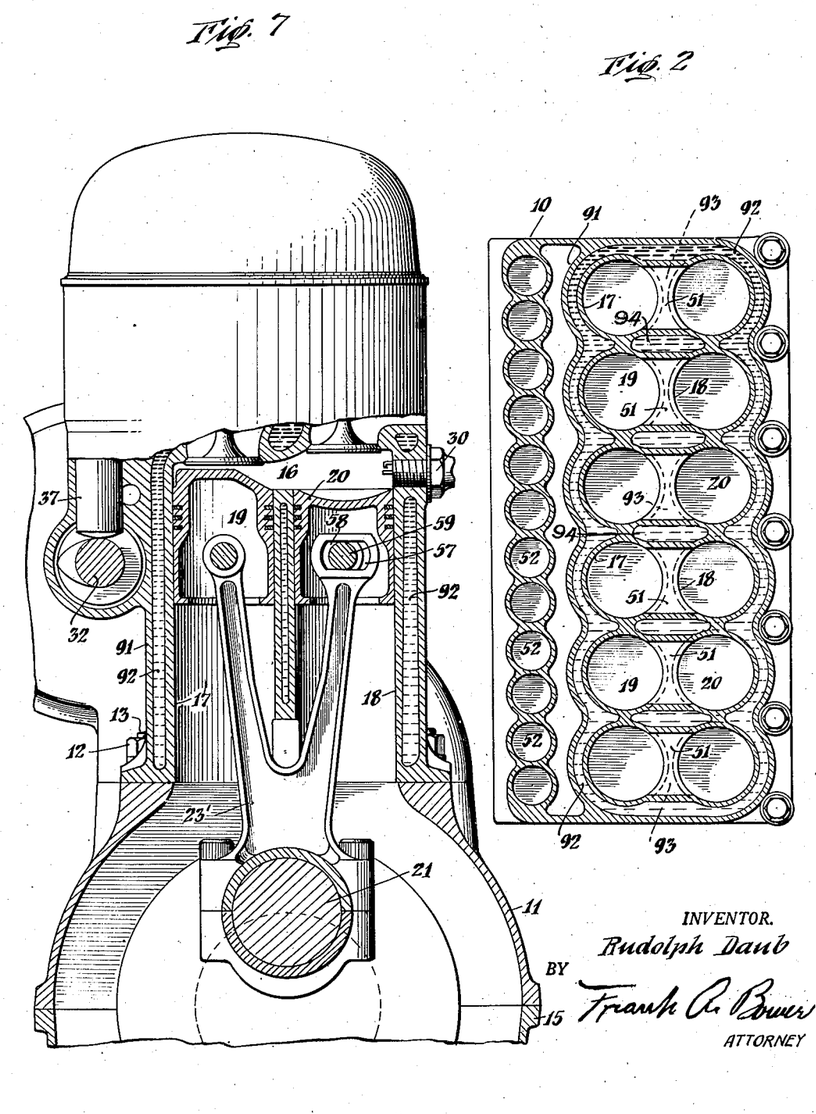
Fig. 2 is a horizontal section taken through the combustion chamber adjacent the valve seats and illustrating the formation of the parts including the cooling passages.
Fig. 7 is a sectional view illustrating a modified form of double piston.

Fig. 2 is a section along the line 2—2 of Fig. 1 and shows throat 51 connecting the master and articulated cylinders 17 and 18. At 52 are shown the holes for the tappets.

In Fig. 3 53 is the main feed hole for the lubrication of the main and connecting rod bearings. On the crank-pin farthest to the right are shown details of knuckle pin 26 and its retainers 54.

The crankcase or crankcase bearing halves 14 and 15 are shown as designed in light alloy in order to eliminate weight and to improve crankshaft-bearing cooling, since aluminum has a heat conductivity of from four to five times greater than cast iron. Since furthermore, for an engine of 80 H. P. the entire crankcase including the flywheel housing and cam gear housing 15' is less than 20" long, its fabrication from a forging is possible, thereby greatly increasing its fatigue strength, it uniformity and adaptability for mass production. For the same engine (80 H. P.) the dimensions for the combined cylinder block and head are 15¼" long, 9⅝" high and 7" wide, permitting it to be made of a high quality iron within reasonable cost. The outstanding shortness of both crankcase and cylinder block renders an assembly of the greatest stiffness in both the vertical and horizontal planes thereby eliminating the second cause of engine roughness, i. e., deflection and vibration of and within the structure, the first cause of roughness having already been dealt with above as originating in the combustion chamber in the form of detonation.

Figures 4, 5:
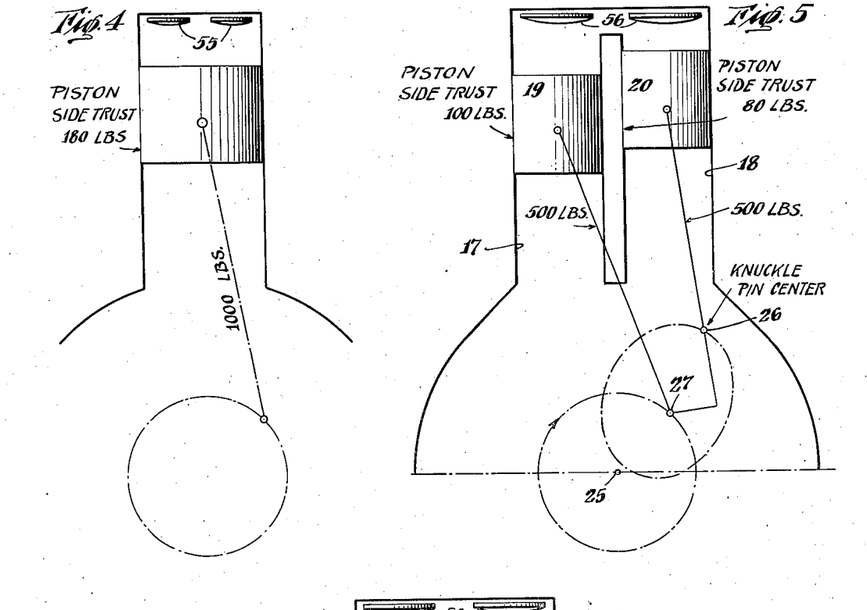
Figs. 4, 5 and 6 are diagrammatic views illustrating piston side thrust.
Figure 6:
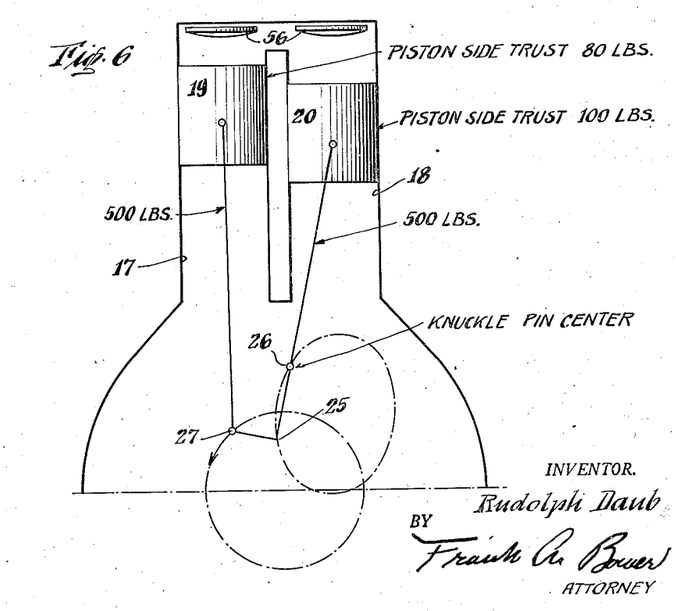

Figs. 4, 5 and 6 are line diagrams of forces indicating the magnitude of piston side thrust. Fig. 4 shows a conventional large piston-small valve cylinder, while Figs. 5 and 6 illustrate a dual small piston-large valve construction. Piston area and strokes of both types of design are equal. While the figures on the forces given are approximate, they show the beneficial effect of the articulated rod and piston action on the master piston and side thrust thereon, i. e., the loads on both the master and articulated pistons are almost equal in spite of the large offset of the crankshaft center from the centerline of the master cylinder. This holds true with the master cylinder, the leading or trailing one in regard to the crankpin motion past both cylinder bores in succession, while describing its path around the crankpin center. 55 designates the valve heads of the large bore cylinder, 56 the valve heads of the small bore dual cylinder.

As shown in section in Fig. 2, the dual cylinder assembly is cast within an outer shell 91 of the block, leaving a space 92 for the circulation of cooling liquid entering preferably at one end of the block and leaving at the other end. Longitudinal spaces 93 are left between the cylinders of each dual unit and transverse spaces 94 between adjacent dual cylinder units so that each cylinder is substantially completely surrounded by the cooling circulation. The jacket 92 is carried upward around the intake passage 43 as indicated at 95 and 96 and the central circulation is carried up between the intake and the exhaust and around the exhaust as shown at 97, 98 and 99, completing the jacketing for very complete and efficient cooling of the entire block by the liquid circulation.

Preferably the circulation entering at one end is introduced near the upper portion of the block substantially along the level of the valve seats and nearer the line of the exhaust valve seats, the outlet at the other end being substantially on the same level and in longitudinal alignment with the supply opening as shown in my Patent No. 2,355,277. With such entrance and discharge the direct line of circulation will be applied at the hottest portion of the engine and the remaining passages are so interconnected as to automatically and efficiently distribute the remainder of the circulation.

Fig. 7 shows an alternate connecting rod system, the rod 23 being of the tuning-fork type with one of its piston ends having a slot 57 cooperating with flats 58 of piston pin 59.

Figure 8:
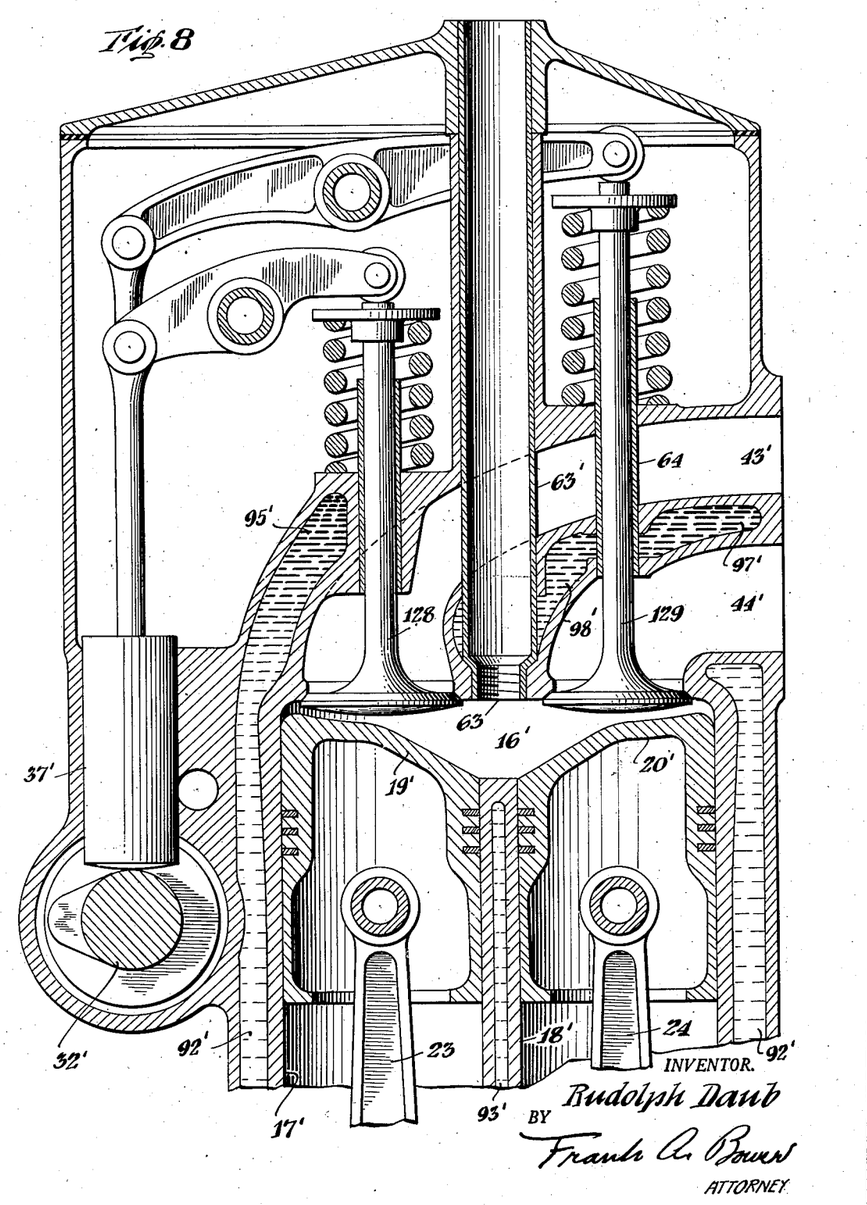
Fig. 8 is a vertical sectional view of a modification showing a central positioning of the spark plug and corresponding shaping of the piston heads with vertical valves.

Fig. 8 is a high compression Diesel engine with a sleeve for a fuel injector nozzle at 63 between intake valve 128 and exhaust valve 129 actuated by overhead rocker arm mechanism including the hydraulic tappets 37' and camshaft 32'. In this design the inlet passage 43' above exhaust passage 44' straddles both the exhaust valve guide 64 and nozzle sleeve 63'. For a very high compression gasoline engine the injector nozzle hole in sleeve 63' can be used for a spark plug. The heads of pistons 19' and 20' in cylinders 17' and 18' are shaped to confine the gases between approaching surfaces of the pistons and cylinder head to narrow the spaces in the directions away from the central spark plug.

Figure 9:
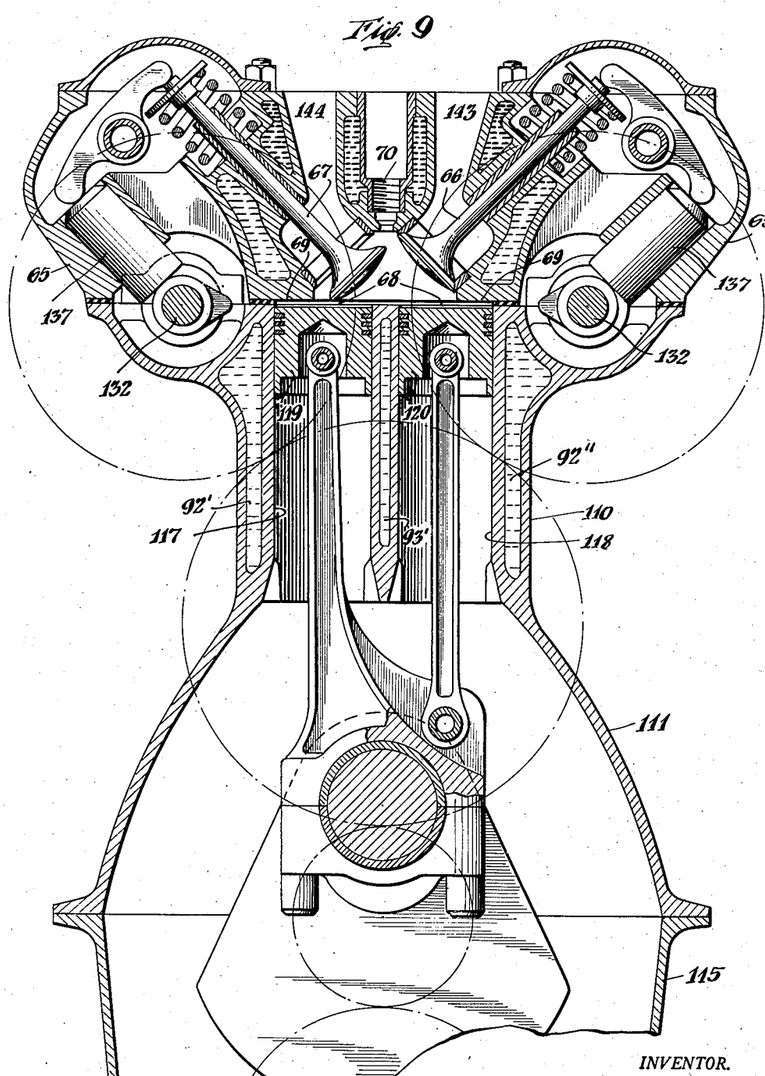
Fig. 9 is a similar view of a further modification showing angular positioning of the valves and valve gear.

Fig. 9 shows a detachable head 65 with angulated valves, 66 for the intake and 67 for the exhaust. The spark plug is placed at 70 in the center of the combustion chamber dome. Close clearance anti-detonation traps 68 are formed between both pistons and their adjacent parts 69 of the cylinder head. The valves are driven from cam shafts 132 through hydraulic tappets 137 as shown, and the intake passage 143 and exhaust 144 are directed upward. Pistons 119 and 120 reciprocate in the cylinders 117 and 118, the cylinder block 110 being integral with the upper part of the crankcase 111, 115. Liquid circulation is provided in the jacket spaces 92' and the circulating passages around the cylinders are substantially the same as those described in connection with Figs. 1, 2 and 3, including the longitudinal spaces 93'.

Figs. 10, 11, 12 and 13 show a modification in which one cylinder 171 is of larger diameter than its mate 181. The master cylinder 171 is formed by the walls of the block casting 10' and the articulated cylinder 181 is formed by the sleeve 180 fitted into the casting as shown with intervening space for cooling circulation surrounding the sleeve as indicated at 192, 193, a corresponding cooling passage 192 being provided on the opposite side of the block for the cylinder 171. At the upper portion of the block the cooling circulation surrounds the intake 74 by the spaces 195 and 199, the latter of which also cooperates with the circulation passages 197 and 198 to cool the exhaust port 72 and the seat for the exhaust valve 71.

Figure 10:
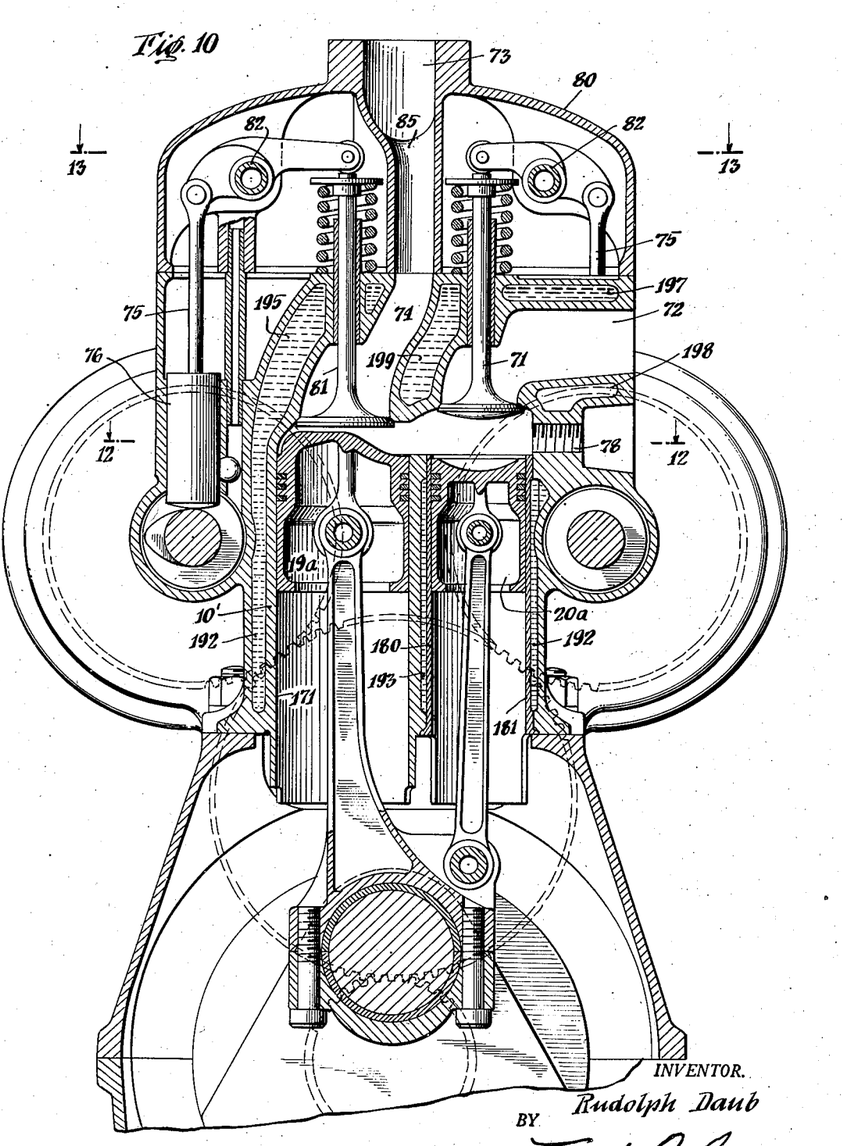
Fig. 10 is a similar view of a still further modification showing the intake passage lead vertically through the top of the engine and with cylinders of different diameters.
Figure 11:
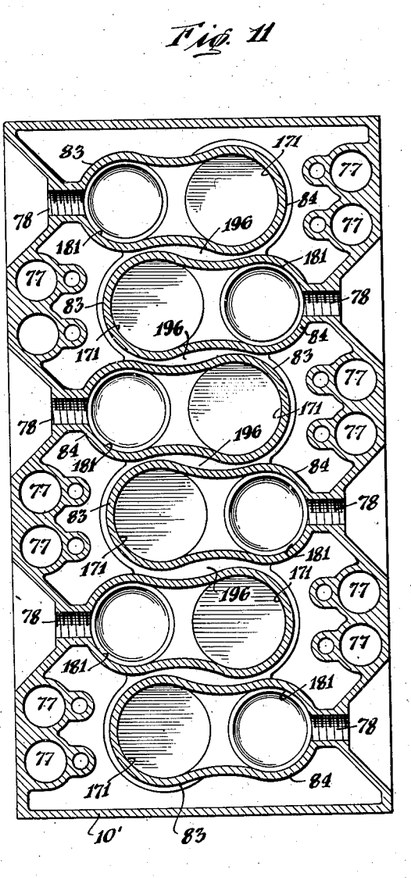
Fig. 11 is a horizontal section of the cylinder casting shown in Fig. 10 illustrating the staggered positioning of the double cylinders giving a still shorter cylinder block.

Fig. 11 shows the engine of Fig. 10 with the staggered position of the two differently sized cylinders 171, 181 in the inner cylinder portion 83, 84 of the casting 10' for a six cylinder power plant. By means of this construction it is possible to increase the piston area and thereby the horsepower for a given block length approximately two and one half times compared to a conventional single row six in line engine.

Figure 12:
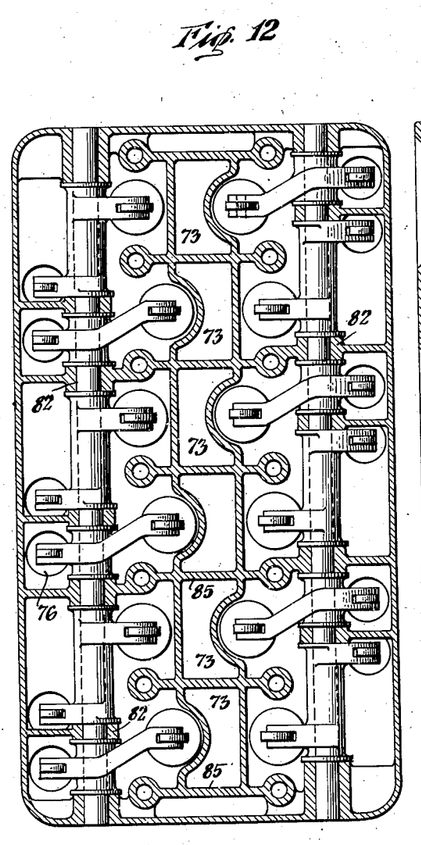
Fig. 12 is a horizontal section showing a plan view of a valve gear for the valves of the engine illustrated in Figs. 10 and 11 with the staggered positioning of the double cylinders.

The exhaust valve 71 (see Fig. 10) is located above the level of the intake valve 81 and over the smaller articulated piston 20a with a row of three exhaust ports 72 on each side of the cylinder block. The intake manifold 73 is formed in the valve cover 80 and feeds all six intake ports 74 as best shown in Fig. 12, which is a section through the combined manifold valve cover 80 and rocker arm bearings 82. This figure also shows the location of the rocker arms which are operated by push rods 75 and tappets 76 (Fig. 10). Tappet guide holes and spark plug holes are shown in Fig. 11 at 77 and 78 respectively.

Figure 13:
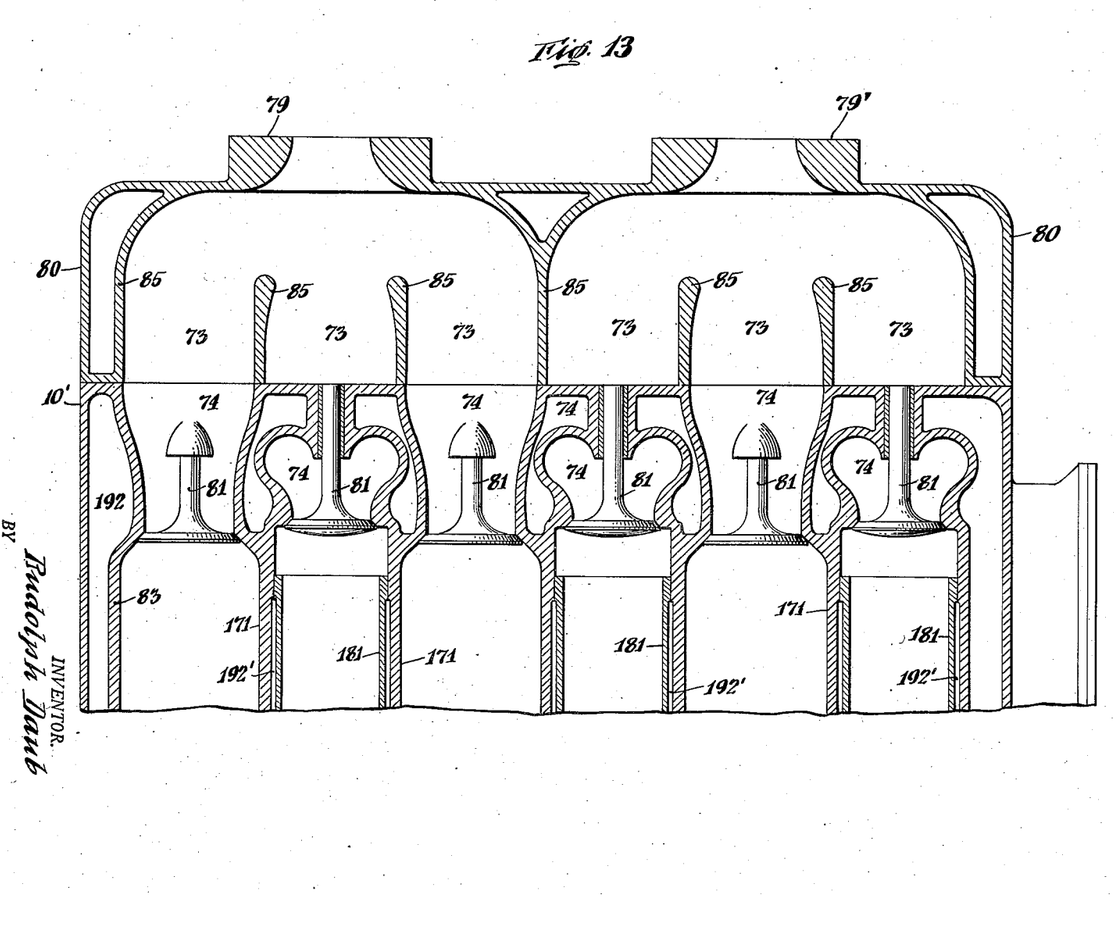
Fig. 13 is a longitudinal vertical sectional view illustrating the formation of the intake passages for the distribution of the intake to the different cylinders of the engine as shown in Figs. 10, 11 and 12.

Fig. 13 is a fragmentary longitudinal section through the intake manifold and valve ports of an engine of the type shown in Figs. 10 to 12 and indicating the use of two separate carburetors attached at flanges 79 and 79'. Partitions 85 intervene between the intake passages 73.

Figure 14:
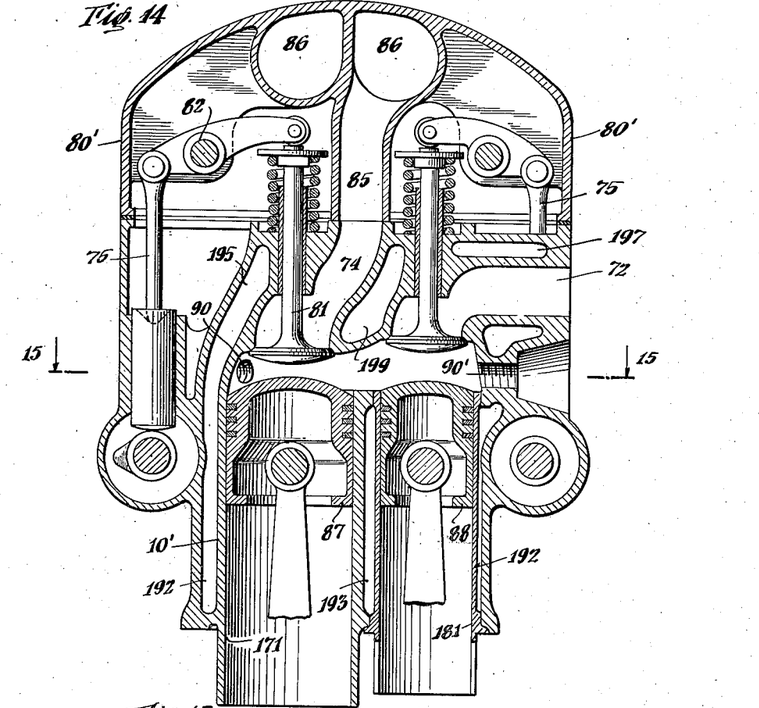
Fig. 14 is a vertical sectional view of a further modified form of the engine of this invention, i. e. provisions are made for dual ignition.
Figure 15:
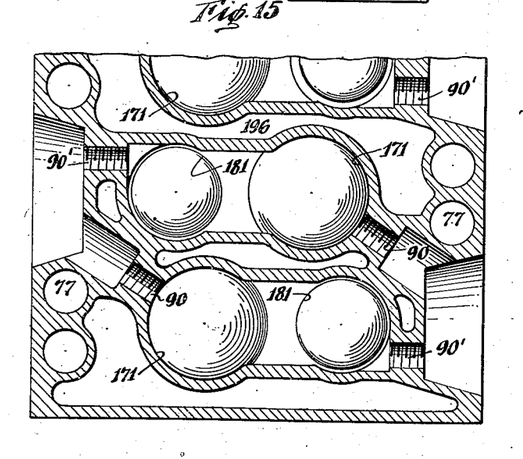
Fig. 15 is a partial sectional view taken on the line 15—15 of Fig. 14, and showing the location of two spark plugs in each combustion chamber.

The engine shown in Figs. 14 and 15 is substantially the same as that of Figs. 10 to 13 but with a double spark plug combustion chamber and with the valve cover 80' modified to provide intake passages 86 from a supercharger as a substitute for the carburetor connections of the cover of Figs. 10–13 inclusive. Spark plug holes are shown at 90 and 90' and the pistons 87 and 88 are preferably crowned as shown.

The engine of this invention thus compresses the power development into small space by so increasing each valve area in comparison with that of the cooperating pistons and utilizing this to full extent in four-cycle operation. At the same time the dual cylinder unit permits a very efficient cooling of the piston heads and valves and avoids over-heating normally following from such increased concentration of power and the higher temperatures involved.

I claim:

1. A four-cycle internal combustion engine comprising a crank shaft, a series of dual cylinders and pistons driving said crank shaft, said cylinders being paired transversely with the pairs in series longitudinally, a series of regularly spaced overhead intake and exhaust valves above said cylinders, each of said valves being above a corresponding cylinder and having a diameter greater than one-half the diameter of said cylinder and with a relatively wide spacing of the exhaust valve above the corresponding piston at the area of ignition, and the intake valve being relatively closely spaced to its piston so as to form detonation traps in the direction of the propagation of the explosion transversely across the combustion spaces of each dual cylinder, and intake and exhaust passages located above said valves.

2. An internal combustion engine as set forth in claim 1 in which the exhaust valve is above the level of the intake valve and has an adjacent area of ignition.

3. A four-cycle internal combustion engine comprising a crank shaft, a series of dual cylinders and pistons driving said crank shaft, said cylinders being paired transversely with the pairs in series longitudinally, a series of regularly spaced overhead intake and exhaust valves above said cylinders forming therewith a combustion space having ignition areas on opposite sides of the engine with the ignition on the exhaust side preceding the ignition on the intake side so that the exhaust spark leads the intake spark by an angle of not over ten degrees, each of said valves being above a corresponding cylinder and having a diameter greater than one-half the diameter of said cylinder, and intake and exhaust passages located above said valves.

4. An internal combustion engine as set forth in claim 1 in which the exhaust valve is at higher level than the intake and the intake piston head is relatively raised and the exhaust piston head lowered to give the relatively wide spacing of the surfaces at the exhaust side of the cylinder at the area of ignition.

5. A four-cycle internal combustion engine comprising a crank shaft, a series of dual cylinders and pistons driving said crank shaft, said cylinders being paired transversely with the pairs in series longitudinally, a series of regularly spaced overhead intake and exhaust valves above said cylinders, each of said valves being above a corresponding cylinder and having a diameter greater than one-half the diameter of said cylinder and forming a combustion space with an ignition area between the exhaust and intake valves, the walls of the combustion space being relatively widely spaced at the center and narrowing toward each valve so as to form a pair of detonation traps in each direction from the ignition, and intake and exhaust passages located above said valves.

6. An internal combustion engine comprising a single crank shaft, a single series of parallel dual cylinders and pistons above said crank shaft and having connecting rods driving said crank shaft as the sole power drive therefor, said cylinders being paired transversely with the pairs in series longitudinally, a single combustion space for each pair of cylinders, a single intake valve and a single exhaust valve for each pair of cylinders with each intake valve at one side of its combustion space and each exhaust valve at the opposite side of said combustion space so that the entire intake of each pair of cylinders is at one side of the combustion space and the entire exhaust at the other side of said space, and intake and exhaust passages located above said valves.

7. An internal combustion engine as set forth in claim 6 in which each intake valve has a diameter greater than one-half the diameter of its corresponding cylinder.

8. An internal combustion engine as set forth in claim 6 in which the intake and exhaust valves have diameters greater than one-half the diameters of their corresponding cylinders.

9. An internal combustion engine as set forth in claim 6 in which the connecting rods comprise a master rod directly connecting one piston to the crank shaft and an auxiliary rod articulated between said master rod and the other piston of the dual pair.

10. An internal combustion engine as set forth in claim 6 in which the intake and exhaust valves have operating means comprising overhead levers and tappet rods arranged in a series extending longitudinally of the engine.

11. An internal combustion engine as set forth in claim 6 in which the intake and exhaust valves have operating means comprising overhead levers and tappet rods arranged in a series extending longitudinally of the engine and along one side thereof.

12. An internal combustion engine as set forth in claim 6 in which the intake and exhaust passages both open on the side of the engine carrying the exhaust valves, the intake passage being carried over above the exhaust passage of each dual cylinder.

13. An internal combustion engine as set forth in claim 6 in which the valves and piston heads of each dual cylinder are closely spaced at one side and widely spaced at the other with the ignition area at the wider spacing so as to form a detonation trap in the direction of the propagation of the explosion transversely across the combustion space.

RUDOLPH DAUB.